US008541495B2

(12) United States Patent
Ishizaki et al.

(10) Patent No.: US 8,541,495 B2
(45) Date of Patent: Sep. 24, 2013

(54) ADHESIVE COMPOSITION

(75) Inventors: Kenichi Ishizaki, Nagoya (JP); Muneaki Kano, Nagoya (JP)

(73) Assignee: Toagosei Co., Ltd., Tokyo (JP)

( * ) Notice: Subject to any disclaimer, the term of this patent is extended or adjusted under 35 U.S.C. 154(b) by 174 days.

(21) Appl. No.: 13/126,679

(22) PCT Filed: Dec. 22, 2009

(86) PCT No.: PCT/JP2009/071346
§ 371 (c)(1),
(2), (4) Date: Jun. 22, 2011

(87) PCT Pub. No.: WO2010/074095
PCT Pub. Date: Jul. 1, 2010

(65) Prior Publication Data
US 2011/0251318 A1    Oct. 13, 2011

(30) Foreign Application Priority Data
Dec. 25, 2008 (JP) ................. 2008-331246

(51) Int. Cl.
*C08K 3/34* (2006.01)
(52) U.S. Cl.
USPC ........... 524/493; 523/212; 524/261; 524/533; 524/534; 524/535; 524/555
(58) Field of Classification Search
USPC ............... 524/493, 533, 534, 261, 535, 555; 523/212
See application file for complete search history.

(56) References Cited

U.S. PATENT DOCUMENTS
6,096,848 A    8/2000  Gololobov et al.
2001/0004655 A1*  6/2001  Takahashi et al. ............ 524/765

FOREIGN PATENT DOCUMENTS

| CN | 1886479 A | 12/2006 |
|---|---|---|
| JP | 59 145271 | 8/1984 |
| JP | 63 003072 | 1/1988 |
| JP | 03 167279 | 7/1991 |
| JP | 03 290484 | 12/1991 |
| JP | 06 57214 | 3/1994 |
| JP | 06 271817 | 9/1994 |
| JP | 08 505383 | 6/1996 |
| JP | 10 500968 | 1/1998 |
| JP | 10 168121 | 6/1998 |
| JP | 11 302602 | 11/1999 |

OTHER PUBLICATIONS

Japanese Office Action issued Oct. 16, 2012, in Patent Application No. 2010-544092 (with English-language translation).
International Search Report issued Mar. 2, 2010 in PCT/JP09/071346 filed Dec. 22, 2009.
Combined Chinese Office Action and Search Report issued Nov. 22, 2012 in Patent Application No. 200980152599.8 with English Translation and English Translation of Category of Cited Documents.
Office Action issued Apr. 19, 2013, in Chinese Application No. 200980152599.8.

* cited by examiner

*Primary Examiner* — David W Wu
*Assistant Examiner* — Marie Reddick
(74) *Attorney, Agent, or Firm* — Oblon, Spivak, McClelland, Maier & Neustadt, L.L.P.

(57) ABSTRACT

An adhesive composition is provided particularly excellent in thermal shock resistance for adhesive strength as well as high shear adhesive strength, peel adhesive strength and impact adhesive strength. The adhesive composition of the present invention contains (a) a 2-cyanoacrylate such as 2-ethoxyethyl 2-cyanoacrylate and (b) a polyfunctional cyanoacrylate having two or more 2-cyanoacryloyl groups, the number average molecular weight of the polyfunctional cyanoacrylate (b) is in the range from 1,000 to 50,000, and preferably from 2,000 to 30,000, and the content of the polyfunctional cyanoacrylate (b) is in the range from 1 to 400 parts by weight, and preferably from 1 to 200 parts by weight based on 100 parts by weight of the 2-cyanoacrylate (a).

16 Claims, No Drawings

ADHESIVE COMPOSITION

FIELD OF THE INVENTION

The present invention relates to an adhesive composition. More specifically, the present invention relates to an adhesive composition which contains a 2-cyanoacrylate and is excellent in thermal shock resistance for adhesive strength as well as high shear adhesive strength, peel adhesive strength and impact adhesive strength.

BACKGROUND ART

Adhesives containing mainly of a 2-cyanoacrylate, which has specific anionic polymerizability, strongly bond various materials to a substrate in a short time by initiating polymerization upon contact with a weak anion such as a small amount of water on the surface of the substrate. Therefore, they are widely used as so-called instantaneous adhesives for industrial, medical, household, and other purposes. These adhesives lead excellent shear adhesive strength, but their cured products are hard and brittle. Therefore, they have low peel strength and impact adhesive strength, and are particularly inferior the thermal shock resistance between bonded substrates of different materials. In order to solve these problems, various reforming methods including the addition of various elastomers and additives have been conventionally proposed in, for example, Patent Documents 1 and 2. Other known methods include the addition of a polyfunctional cyanoacrylate such as bifunctional cyanoacrylate to the adhesive in, for example, Patent Documents 3 and 4.

[Patent Document 1] JP-A H3-290484
[Patent Document 2] JP-A H6-57214
[Patent Document 3] JP-A H10-500968
[Patent Document 4] JP-A H11-302602

DISCLOSURE OF THE INVENTION

Problems That the Invention Is To Solve

However, reforming methods disclosed in Patent Documents 1 and 2 may fail to sufficiently improve thermal shock resistance, particularly between bonded substrates of different materials. Additionally, purposes formulating a polyfunctional cyanoacrylate in Patent Documents 3 and 4 are to improve heat resistance and wet-heat resistance of the adhesives, and thermal shock resistance is not mentioned at all.

The present invention has been accomplished in view of the above-described circumstances, and an object thereof is to provide an adhesive composition which contains a 2-cyanoacrylate and is excellent in thermal shock resistance for adhesive strength as well as high shear adhesive strength, peel adhesive strength and impact adhesive strength.

Means For Solving the Problems

The present invention is as follows.
1. An adhesive composition which comprises (a) a 2-cyanoacrylate and (b) a polyfunctional cyanoacrylate having two or more 2-cyanoacryloyl groups, and is characterized in that the number average molecular weight of the polyfunctional cyanoacrylate (b) is in the range from 1,000 to 50,000, and that the content of the polyfunctional cyanoacrylate (b) is in the range from 1 to 400 parts by weight based on 100 parts by weight of the 2-cyanoacrylate.
2. The adhesive composition according to 1 above, wherein the polyfunctional cyanoacrylate (b) is an ester of 2-cyanoacrylic acid using a polyoxyalkylene polyol, a polyester polyol, a polycarbonate polyol, a polybutadiene polyol, a hydrogenated polybutadiene polyol, a polyisoprene polyol, or a hydrogenated polyisoprene polyol.
3. The adhesive composition according to 1 or 2 above, wherein the adhesive composition comprises a copolymer prepared from a monomer giving a polymer slightly soluble in a 2-cyanoacrylate and a monomer giving a polymer soluble in a 2-cyanoacrylate, and wherein the content of the copolymer is in the range from 2 to 40 parts by weight based on 100 parts by weight of the 2-cyanoacrylate.
4. The adhesive composition according to 3 above, wherein the monomer giving a polymer slightly soluble in a 2-cyanoacrylate is at least one compound from the group consisting of ethylene, propylene, isoprene and butadiene, and wherein the monomer giving a polymer soluble in a 2-cyanoacrylate is at least one of an acrylic acid ester and a methacrylic acid ester.
5. The adhesive composition according to any one of 1 to 4 above, wherein the adhesive composition comprises a fumed silica, and wherein the content of the fumed silica is in the range from 1 to 30 parts by weight based on 100 parts by weight of the 2-cyanoacrylate.

Effect of the Invention

The adhesive composition of the present invention contains a 2-cyanoacrylate and a polyfunctional cyanoacrylate having a specific number average molecular weight at a predetermined weight ratio. Therefore, the adhesive composition has high shear adhesive strength intrinsic to an adhesive containing a 2-cyanoacrylate, and also has sufficient peel adhesive strength and impact adhesive strength, which may be poor in prior art adhesives. Moreover, the adhesive composition has a markedly good thermal shock resistance.

When the polyfunctional cyanoacrylate (b) is an ester of 2-cyanoacrylic acid using a polyoxyalkylene polyol, a polyester polyol, a polycarbonate polyol, a polybutadiene polyol, a hydrogenated polybutadiene polyol, a polyisoprene polyol, or a hydrogenated polyisoprene polyol, the adhesive composition has a high shear adhesive strength and the like, and markedly good thermal shock resistance.

Additionally, when the polyfunctional cyanoacrylate (b) is an ester of 2 cyanoacrylic acid using a polybutadiene polyol, a hydrogenated polybutadiene polyol, a polyisoprene polyol, or a hydrogenated polyisoprene polyol, the adhesive composition may have a good thermal shock resistance and hot water resistance.

Further, when a copolymer prepared from a monomer giving a polymer slightly soluble in a 2-cyanoacrylate and a monomer giving a polymer soluble in a 2-cyanoacrylate is contained and the content of the copolymer is in the range from 2 to 40 parts by weight based on 100 parts by weight of the 2-cyanoacrylate, the adhesive composition has a high shear adhesive strength, sufficient peel strength and impact adhesive strength, and markedly good thermal shock resistance.

When the monomer giving a polymer slightly soluble in a 2-cyanoacrylate is at least one compound from the group consisting of ethylene, propylene, isoprene and butadiene, and wherein the monomer giving a polymer soluble in a 2-cyanoacrylate is at least one of an acrylic acid ester and a methacrylic acid ester, a copolymer can be readily produced which is adequately soluble in a 2-cyanoacrylate, and the adhesive composition has a high shear adhesive strength and the like, and excellent thermal shock resistance.

Moreover, when a fumed silica is contained, and the content of the fumed silica is in the range from 1 to 30 parts by weight based on 100 parts by weight of the 2-cyanoacrylate, the adhesive composition has a high shear adhesive strength and the like, and excellent thermal shock resistance.

BEST MODE FOR CARRYING OUT THE INVENTION

In the following, the adhesive composition of the present invention will be explained in detail.

The adhesive composition of the present invention contains (a) a 2-cyanoacrylate and (b) a polyfunctional cyanoacrylate having two or more 2-cyanoacryloyl groups, and the content of the polyfunctional cyanoacrylate (b) is in the range from 1 to 400 parts by weight based on 100 parts by weight of the 2-cyanoacrylate (a).

The "2-cyanoacrylate (a)" is not particularly limited and may be an ester of 2-cyanoacrylic acid which is commonly used in an adhesive composition of this type. Examples of the 2-cyanoacrylate include methyl, ethyl, chloroethyl, n-propyl, i-propyl, allyl, propargyl, n-butyl, butyl, n-pentyl, n-hexyl, cyclohexyl, phenyl, tetrahydrofurfuryl, heptyl, 2-ethylhexyl, n-octyl, 2-octyl, n-nonyl, oxononyl, n-decyl, n-dodecyl, methoxyethyl, methoxypropyl, methoxyisopropyl, methoxybutyl, ethoxyethyl, ethoxypropyl, ethoxyisopropyl, propoxymethyl, propoxyethyl, isopropoxyethyl, propoxypropyl, butoxymethyl, butoxyethyl, butoxypropyl, butoxyisopropyl, butoxybutyl, 2,2,2-trifluoroethyl and hexafluoroisopropyl esters of 2-cyanoacrylic acid. These 2-cyanoacrylates may be used singly or in combination of two or more types thereof. When two or more of the esters are used in combination, combination is not particularly limited. Example thereof includes a combination of ethyl 2-cyanoacrylate and 2-ethoxyethyl 2-cyanoacrylate, a combination of isobutyl 2-cyanoacrylate and 2-ethoxyethyl 2-cyanoacrylate, a combination of isopropyl 2-cyanoacrylate and 2-octyl 2-cyanoacrylate, a combination of isobutyl 2-cyanoacrylate and 2-octyl 2-cyanoacrylate, and the like.

The "polyfunctional cyanoacrylate (b)" is not particularly limited so long as it has two or more 2-cyanoacryloyl groups. Examples of the polyfunctional cyanoacrylate include an ester of 2-cyanoacrylic acid of a polyoxyalkylene polyol, a polyester polyol, a polycarbonate polyol, a polyurethane polyol, a polyamide polyol, a polyester polyamide polyol, an acryl polyol, a polybutadiene polyol, a hydrogenated polybutadiene polyol, an ethylene butylene copolymer polyol, a polyisoprene polyol, a hydrogenated polyisoprene polyol, a polyvinyl butyral, a polyvinyl formal, a polyvinyl alcohol, a phenolic resin, a silane or siloxane compounds having a hydroxyl group at each terminal, and the like. The polyfunctional cyanoacrylate may be used singly or in combination of two or more types thereof.

From viewpoints of flexibility and toughness in a resultant cured product, preferable examples of the polyfunctional cyanoacrylate include esters of 2-cyanoacrylic acid of a polyoxyalkylene polyol, a polyester polyol, a polycarbonate polyol, a polyurethane polyol, a polyamide polyol, a polyester polyamide polyol, an acryl polyol, a polybutadiene polyol, a hydrogenated polybutadiene polyol, a polyisoprene polyol and a hydrogenated polyisoprene polyol. Among these, esters of 2-cyanoacrylic acid of a polyoxyalkylene polyol, a polyester polyol, a polycarbonate polyol, a polybutadiene polyol, a hydrogenated polybutadiene polyol, a polyisoprene polyol and a hydrogenated polyisoprene polyolare more preferable.

The polyoxyalkylene polyol is not particularly limited. The above-mentioned polyol such as a polyethylene glycol, polyethylene triol, polyethylene tetraol, polypropylene glycol, polypropylene triol, polypropylene tetraol, and polytetramethylene glycol, or a copolymer with other glycols may be used. The polyester polyol is also not particularly limited. Publicly known polyester polyols obtained by a reaction of a dibasic acid such as adipic acid and a glycol or triol, a polycaprolactone polyol obtained by ring-opening polymerization of a caprolactone, and the like may be used. Further, the polycarbonate diol is also not particularly limited. Publicly known polycarbonate diols derived from ethylene carbonate or the like, and those obtained by copolymerization of a carbonate and a glycol, and the like may be used. Moreover, the esters of 2-cyanoacrylic acid of a polybutadiene polyol, hydrogenated polybutadiene polyol, polyisoprene polyol, and hydrogenated polyisoprene polyol are preferred, because the cured products thereof have flexibility and toughness, and have excellent hot water resistance.

The number average molecular weight of the polyfunctional cyanoacrylate is in the range from 1,000 to 50,000, preferably from 1,500 to 40,000, more preferably from 2,000 to 30,000, and particularly from 2,000 to 25,000. When the number average molecular weight of the polyfunctional cyanoacrylate is in the range from 1,000 to 50,000, the polyfunctional cyanoacrylate has a sufficient compatibility with 2-cyanoacrylate, and the adhesive composition has a high shear adhesive strength and excellent thermal shock resistance.

The average molecular weight in the present invention is measured by gel permeation chromatography (hereinafter, referred to as "GPC"). In the GPC measurement, the mobile phase was tetrahydrofuran, the column was a polystyrene gel column, and the molecular weight was determined relative to a polystyrene standard.

The content of the polyfunctional cyanoacrylate in the adhesive composition is in the range from 1 to 400 parts by weight based on 100 parts by weight of the 2-cyanoacrylate. The preferable content depends on types of the 2-cyanoacrylate and polyfunctional cyanoacrylate, and it is preferably in the range from 1 to 300 parts by weight, more preferably from 1 to 250 parts by weight, further preferably from 1 to 200 parts by weight, and particularly from 1 to 150 parts by weight. When the content of the polyfunctional cyanoacrylate is in the range from 1 to 400 parts by weight, particularly from 1 to 200 parts by weight, the adhesive composition has a sufficient shear adhesive strength and excellent thermal shock resistance.

The adhesive composition may contain a copolymer prepared from a monomer giving a polymer slightly soluble in a 2-cyanoacrylate and a monomer giving a polymer soluble in a 2-cyanoacrylate. The copolymer has a slightly soluble segment formed by polymerization of the monomer giving a polymer slightly soluble in a 2-cyanoacrylate, and a soluble segment formed by polymerization of the monomer giving a polymer soluble in a 2-cyanoacrylate.

The monomer giving a polymer slightly soluble in a 2-cyanoacrylate is not particularly limited and example thereof includes ethylene, propylene, isoprene, butadiene, chloroprene, 1-hexene, cyclopentene and the like. These monomers may used singly or in combination of two or more types thereof. Among these, ethylene, propylene, isoprene, butadiene and chloroprene are often used as the monomer giving a polymer slightly soluble.

Additionally, the monomer giving a polymer soluble in a 2-cyanoacrylate is not particularly limited and example thereof includes an acrylic acid ester, methacrylic acid ester, vinyl chloride, vinyl acetate, vinyl ether, styrene, acrylonitrile and the like. Examples of the acrylic acid ester include methyl acrylate, ethyl acrylate, n-propyl acrylate, propyl acrylate, n-butyl acrylate, i-butyl acrylate, n-hexyl acrylate, n-heptyl acrylate, n-octyl acrylate, 2-ethylhexyl acrylate, methoxyethyl acrylate, methoxypropyl acrylate, ethoxyethyl acrylate, ethoxypropyl acrylate and the like. These monomers may used singly or in combination of two or more types thereof.

Further, examples of the acrylic acid ester include methyl methacrylate, ethyl methacrylate, n-propyl methacrylate, i-propyl methacrylate, n-butyl methacrylate, i-butyl methacrylate, n-hexyl methacrylate, n-heptyl methacrylate, n-octyl methacrylate, 2-ethylhexyl methacrylate, methoxyethyl methacrylate, methoxypropyl methacrylate, ethoxyethyl methacrylate, ethoxypropyl methacrylate and the like. These monomers may used singly or in combination of two or more types thereof. The acrylic acid ester and methacrylic acid ester may be used in combination.

The ratio of the slightly soluble segment formed by polymerization of the monomer giving a polymer slightly soluble and the soluble segment formed by polymerization of the monomer giving a polymer soluble is not particularly limited. The contents of the slightly soluble segment and the soluble segment are preferably 5% to 90% by mol and 10% to 95% by mol, more preferably 10% to 80% by mol and 20% to 90% by mol, respectively, based on 100% by mol of the total of these segments. The contents of the slightly soluble segment and the soluble segment are further preferably 30% to 80% by mol and 20% to 70% by mol, furthermore preferably 40% to 80% by mol and 20% to 60% by mol, and particularly 50% to 75% by mol and 25% to 50% by mol, respectively. When the contents of the slightly soluble segment and the soluble segment are, respectively, 5% to 90% by mol and 10% to 95% by mol, particularly 30% to 80% by mol and 20% to 70% by mol, the copolymer may be adequately dissolved in a 2-cyanoacrylate, and leads to an adhesive composition having a high shear adhesive strength and excellent good thermal shock resistance.

The content of the segments can be calculated from the integral value of proton by proton nuclear magnetic resonance spectroscopy (hereinafter, referred to as "$^1$H-NMR").

The adhesive composition may contain a copolymer prepared from a monomer giving a polymer slightly soluble in a 2-cyanoacrylate, a monomer giving a polymer soluble in a 2-cyanoacrylate, and a small amount of a monomer having a carboxyl group. The monomer having a carboxyl group is not particularly limited and example thereof includes acrylic acid, methacrylic acid, maleic acid, fumaric acid, itaconic acid, crotonic acid, cinnamic acid and the like. These monomers may used singly or in combination of two or more types thereof. Among these, acrylic acid and methacrylic acid are often used as the monomer having a carboxyl group and only one type may be used or both may be used. A segment having a carboxyl group obtained by polymerization of the monomer having a carboxyl group will become a segment soluble in a highly hydrophilic 2-cyanoacrylate. The use of an adequate amount of the monomer having a carboxyl group enhances the affinity between the copolymer, and a fumed silica surface which has not been subjected to a hydrophobization treatment, or a highly hydrophilic 2-cyanoacrylate.

The content of the segment having a carboxyl group is not particularly limited and is preferably in the range from 0.1% to 5% by mol, more preferably from 0.3% to 4% by mol, and particularly from 0.4% to 3% by mol, based on 100% by mol of the total of the slightly soluble segment, the soluble segment and the segment having a carboxyl group. In addition, the content thereof may be 0.5% to 2.5% by mol and preferably from 0.5% to 2% by mol. When the proportion of the segment having a carboxyl group is in the range from 0.1% to 5% by mol, particularly from 0.5% to 2.5% by mol, the adhesive composition quickly cures after being applied to a substrate, and has a high shear adhesive strength and excellent thermal shock resistance.

The content of the segment having a carboxyl group can be determined by potentiometric titration or indicator titration in accordance with JIS K 0070.

Examples of the copolymer include ethylene methyl acrylate copolymer, ethylene methyl acrylate butyl acrylate copolymer, ethylene methyl methacrylate copolymer, ethylene vinyl acetate copolymer, butadiene methyl acrylate copolymer, butadiene acrylonitrile copolymer, butadiene acrylonitrile acrylic acid ester copolymer, butadiene styrene acrylonitrile methyl acrylate copolymer, and the like. Among the copolymers, ethylene methyl acrylate copolymer and ethylene methyl acrylate butyl acrylate copolymer are particularly preferred. In addition, a copolymer obtained by polymerization of a monomer for the above-mentioned copolymer, and a monomer having a carboxyl group such as acrylic acid and methacrylic acid can be used. These copolymers may be used singly or in combination of two or more types thereof. A copolymer obtained using no monomers having a carboxyl group and a copolymer obtained using a monomer having a carboxyl group may be used in combination. Any of the copolymer obtained using no monomers having a carboxyl group and the copolymer obtained using a monomer having a carboxyl group may be used. When a highly hydrophobic 2-cyanoacrylate is used, which has an alkyl group having, for example, 4 or more, specifically 5 or more carbon atoms, the copolymer obtained using no monomers having a carboxyl group is preferably used. When a highly hydrophilic 2-cyanoacrylate is used, which has an alkyl group having, for example, 3 or less, specifically 2 or less carbon atoms, or an alkoxyalkyl group, the copolymer obtained using a monomer having a carboxyl group is preferably used.

The average molecular weight of the copolymer is not particularly limited so long as the number average molecular weight (Mn) is in the range from 5,000 to 500,000. It is preferably in the range from 10,000 to 200,000, more preferably from 15,000 to 150,000, and particularly from 20,000 to 100,000. When the number average molecular weight of the copolymer is in the range from 5,000 to 500,000, specifically from 10,000 to 200,000, the copolymer is readily dissolved in a 2-cyanoacrylate, and leads to an adhesive composition giving a high retention rate of the adhesive strength after a thermal shock resistance test. In addition, the weight average molecular weight (Mw) of the copolymer is preferably in the range from 5,000 to 1,000,000, and particularly from 10,000 to 1,000,000. Mn/Mn is preferably in the range from 1.00 to 10.0, and particularly from 1.00 to 8.0.

The average molecular weight of the copolymer can be measured by GPC as described below.

The content of the copolymer in the adhesive composition is in the range from 2 to 40 parts by weight based on 100 parts by weight of the 2-cyanoacrylate. The preferable content of the copolymer depends on the type of the 2-cyanoacrylate, types and amounts of used monomer for the production of the copolymer, types and contents of fumed silica, and the like, and is preferably in the range from 3 to 35 parts by weight, and particularly from 5 to 30 parts by weight. When the content of the copolymer is in the range from 2 to 40 parts by weight, especially from 3 to 35 parts by weight, the adhesive composition has a sufficient shear adhesive strength and excellent thermal shock resistance.

The adhesive composition may contain a fumed silica. The fumed silica is of anhydrous silica having ultrafine powder with a primary particle size of 500 nm or less, specifically from 1 to 200 nm. The anhydrous silica having ultrafine powder with a primary particle size of 500 nm or less, specifically from 1 to 200 nm is made from, for example, silicon tetrachloride and is formed by oxidation in a gas phase in a flame at high temperature. There are hydrophilic silica with high hydrophilicity and hydrophobic silica with high hydrophobicity. The fumed silica may be hydrophilic or hydrophobic silica, but is preferably hydrophobic silica because it is favorably dispersed in a 2-cyanoacrylate and copolymer. In the case of using a copolymer prepared mostly from a monomer giving a polymer soluble in a 2-cyanoacrylate, or containing many soluble segments (including a segment having a carboxyl group), the combination with hydrophilic silica is preferred. In the case of using a copolymer prepared mostly from a monomer giving a polymer slightly soluble in a 2-cyanoacrylate, or containing many slightly soluble segments, the combination with hydrophobic silica is preferred.

Various commercially available products may be used as the hydrophilic silica and example thereof includes a product name "Aerosil 50", "Aerosil 130", "Aerosil 200", "Aerosil 300", and "Aerosil 380" manufactured by Nippon Aerosil Co., Ltd., and the like. The specific surface areas of these hydrophilic silicas are 50±15 $m^2/g$, 130±25 $m^2/g$, 200±25 $m^2/g$, 300±30 $m^2/g$, and 380±30 $m^2/g$, respectively. Furthermore, examples of the commercially available product include a product name "Reolosil QS-10", "Reolosil QS-20", "Reolosil QS-30", and "Reolosil QS-40" manufactured by Tokuyama Corp., and the like. The specific surface areas of these hydrophilic silicas are 140±20 $m^2/g$, 220±20 $m^2/g$, 300±30 $m^2/g$, and 380±30 $m^2/g$, respectively. In addition, commercially available products manufactured by CABOT Corp. may be used as the hydrophilic silica.

Further, as the hydrophobic silica, a product may be used which is prepared by treating a surface of a hydrophilic silica by contacting the hydrophilic silica with a compound which reacts with a hydroxyl group present on the surface of the hydrophilic silica to form a hydrophobic group, or a compound which is adsorbed to the surface of the hydrophilic silica to form a hydrophobic layer on the surface in the presence or absence of a solvent, preferably under heating.

Examples of the compound used for hydrophobization of the surface of the hydrophilic silica include various alkyl-based, aryl-based, and aralkyl-based silane coupling agents having hydrophobic group such as n-octyltrialkoxysilane, a silylating agent such as methyltrichlorosilane, dimethyldichlorosilane and hexamethyldisilazane, a silicone oil such as polydimethylsiloxane, a higher alcohol such as stearyl alcohol, a higher fatty acid such as stearic acid, and the like. As the hydrophobic silica, a product may be used which is obtained using any of these compounds.

Examples of the commercially available hydrophobic silica include product names "Aerosil RY200" and "Aerosil R202" manufactured by Nippon Aerosil Co., Ltd., that are obtained using a silicone oil for surface treatment to hydrophobizate, "Aerosil R974", "Aerosil R972" and "Aerosil R976" manufactured by Nippon Aerosil Co., Ltd., that are obtained using a dimethylsilylating agent for surface treatment to hydrophobizate, "Aerosil R805" manufactured by Nippon Aerosil Co., Ltd., that is obtained using n-octyltrimethoxysilane for surface treatment to hydrophobizate, "Aerosil R811" and "Aerosil R812" manufactured by Nippon Aerosil Co., Ltd., that are obtained using a trimethylsilylating agent for surface treatment to hydrophobizate, and a product name "Reolosil MT-10" manufactured by Tokuyama Corp., that is obtained using methyltrichlorosilane for surface treatment to hydrophobizate, and the like. The specific surface areas of these hydrophobic silicas are 100±20 $m^2/g$, 100±20 $m^2/g$, 170±20 $m^2/g$, 110±20 $m^2/g$, 150±20 $m^2/g$, 250±25 $m^2/g$, 150±20 $m^2/g$, 150±20 $m^2/g$, 260±20 $m^2/g$, and 120±20 $m^2/g$, respectively.

The content of the fumed silica in the adhesive composition is in the range from 1 to 30 parts by weight based on 100 parts by weight of the 2-cyanoacrylate. The preferable content of the fumed silica depends on the type of the 2-cyanoacrylate, the types and ratio of monomers for the production of the copolymer, the type of the fumed silica, and the like. It is preferably in the range from 1 to 25 parts by weight, and particularly from 2 to 20 parts by weight. When the content of the fumed silica is in the range from 1 to 30 parts by weight, especially from 1 to 25 parts by weight, the adhesive composition has a high shear adhesive strength and the like, and excellent theLmal shock resistance.

It is noted that since,the viscosity of the adhesive composition tends to increase with the increase of the content of the fumed silica, the content must be selected in consideration of processabilities in the preparation of the adhesive composition, the application of the adhesive composition onto a substrate, and the like.

The adhesive composition of the present invention may further contain, in addition to the above-mentioned essential components, other additives according to the intended use, such as an anionic polymerization accelerator, a stabilizer, a plasticizer, a thickener, a coloring agent, a perfume, a solvent, and a strength improver, which are commonly contained in conventional adhesive compositions containing a 2-cyanoacrylate, in adequate amounts, without impairing the curability and adhesive strength of the adhesive composition.

Examples of the anionic polymerization accelerator include a polyalkylene oxide, a crown ether, a silacrown ether, a calixarene, a cyclodextrin, a pyrogallol cyclic compound, and the like. The polyalkylene oxide is a polyalkylene oxide and derivatives thereof, and examples thereof include those disclosed in JP-B S60-37836, JP-B H01-43790, JP-A S63-128088, JP-A H03-167279, and U.S. Pat. Nos. 4,386,193 and 4,424,327. Specific examples include (1) a polyalkylene oxide such as diethylene glycol, triethylene glycol, polyethylene glycol and polypropylene glycol; (2) derivatives of a polyalkylene oxide, such as polyethylene glycol monoalkyl ester, polyethylene glycol dialkyl ester, polypropylene glycol dialkyl ester, diethylene glycol monoalkyl ether, diethylene glycol dialkyl ether, dipropylene glycol monoalkyl ether, and dipropylene glycol dialkyl ether; and the like. Examples of the crown ether include compounds disclosed in, for example, JP-B S55-2236, JP-A H3-167279, and the like. Specific example thereof includes 12-crown-4, 15-crown-5, 18-crown-6, benzo-12-crown-4, benzo-15-crown-5, benzo-18-crown-6, dibenzo-18-crown-6, dibenzo-24-crown-8, dibenzo-30-crown-10, tribenzo-18-crown-6, asym-dibenzo-22-crown-6, dibenzo-14-crown-4, dicyclohexyl-24-crown-8, cyclohexyl-12-crown-4, 1,2-decalyl-15-crown-5, 1,2-naphtho-15-crown-5, 3,4,5-naphthyl-16-crown-5, 1,2-methyl-benzo-18-crown-6, 1,2-tert-butyl-18-crown-6, 1,2-vinyl benzo-15-crown-5, and the like. Examples of the silacrown ether include compounds disclosed in, for example, JP-A S60-168775, and the like. Specific example thereof includes dimethylsila-11-crown-4, dimethylsila-14-crown-5, dimethylsila-17-crown-6, and the like. Examples of the calixarene include compounds disclosed in, for example, JP-A S60-179482, JP-A S62-235379, JP-A S63-88152, and the like. Specific example thereof include 5,11,17,23,29,35-hexa-tert-butyl-37,38,39,40,41,42-hexahydroxycalix[6]arene, 37,38, 39,40,41,42-hexahydroxycalix[6]arene, 37,38,39,40,41,42-hexa-(2-oxo-2-ethoxy)-ethoxycalix[6]arene, 25,26,27,28-tetra-(2-oxo-2-ethoxy)-ethoxycalix[4]arene, and the like. Examples of the cyclodextrin include compounds disclosed in, for example, JP-A H05-505835, and the like. Specific example thereof include α-, β- and γ-cyclodextrin, and the like. Examples of the pyrogallol cyclic compound include compounds disclosed in, for example, JP-A 2000-191600, and the like. Specific example thereof include 3,4,5,10,11,12,17,18,19,24,25,26-dodecaethoxy carbomethoxy-C-1, C-8, C-15, C-22-tetramethyl[14]-metacyclophane, and the like. The anionic polymerization accelerator may be used singly or in combination of two or more types thereof.

Examples of the stabilizer include (1) an anionic polymerization inhibitor such as sulfur dioxide; an aliphatic sulfonic acid including methane sulfonic acid; an aromatic sulfonic acid including p-toluene sulfonic acid; boron trifluoride diethyl etherate, $HBF_4$, and trialkyl borate, (2) a radical polymerization inhibitor such as hydroquinone, t-butyl catechol, catecol, and pyrogallol, and the like. The stabilizer may be used singly or in combination of two or more types thereof.

In the case where a copolymer obtained using a monomer giving a slightly soluble polymer in more amounts, that is a copolymer containing many slightly soluble segment (copolymer containing 65% or more by mol of a slightly soluble segment) is formulated in particular, when the plasticizer is used in a moderate amount, the solubility of the copolymer can be improved. Examples of the plasticizer include acetyl triethyl citrate, acetyl tributyl citrate, dimethyl adipate, diethyl adipate, dimethyl sebacate, dimethyl phthalate, diethyl phthalate, dibutyl phthalate, diisodecyl phthalate, dihexyl phthalate, diheptyl phthalate, dioctyl phthalate, bis(2-ethylhexyl) phthalate, diisononyl phthalate, diisotridecyl phthalate, dipentadecyl phthalate, dioctyl terephthalate, diisononyl isophthalate, decyl toluate, bis(2-ethylhexyl) camphoate, 2-ethylhexyl cyclohexyl carboxylate, diisobutyl fumarate, diisobutyl maleate, triglyceride caproate, 2-ethylhexyl benzoate, dipropylene glycol dibenzoate, and the like. Among these, acetyl tributyl citrate, dimethyl adipate, dimethyl phthalate, 2-ethylhexyl benzoate and dipropylene glycol dibenzoate are preferred from the viewpoint of an excellent compatibility with the 2-cyanoacrylate, and a high plasticizing efficiency. The plasticizer may be used singly or in combination of two or more types thereof. The content of the plasticizer is not particularly limited and is preferably in the range from 3 to 50 parts by weight, more preferably from 10 to 45 parts by weight, and particularly from 20 to 40 parts by weight based on 100 parts by weight of the 2-cyanoacrylate. When the content of the plasticizer is in the range from 3 to 50 parts by weight, particularly when a copolymer having many slightly soluble segments is used, the copolymer is readily dissolved in the 2-cyanoacrylate, and the retention rate of the adhesive strength after a thermal shock resistance test can be improved.

Examples of the thickener include poly methyl methacrylate, an acrylic rubber, poly vinyl chloride, polystyrene, a cellulose ester, a poly alkyl-2-cyanoacrylate, an ethylene vinyl acetate copolymer and the like. The thickener may be used singly or in combination of two or more types thereof.

EXAMPLES

Hereinafter, the present invention is specifically explained with Examples.

[1] Synthesis of Polyfunctional Cyanoacrylate

Synthesis Example 1

Compound A 2.40 g (20.8 mmol) of cyanoacrylic chloride and 135 ml of benzene were placed in a 500-ml flask equipped with a stirrer, a thermometer, a Liebig condenser, a nitrogen inlet tube, and a dropping funnel. Then, the reaction system was heated to 60° C., and a solution in which 94.5 g of polypropylene glycol having hydroxyl groups at each terminal and having number average molecular weight of 10,000 from catalog data (product name "PREMINOL S-4011" manufactured by ASAHI GLASS CO., LTD.) was dissolved in 60 ml of benzene was added while nitrogen gas was blown into the flask through the nitrogen inlet tube. Subsequently, the mixture was stirred for 30 minutes while keeping a temperature at 60° C. After that, the mixture was cooled to room temperature (15° C.-35° C.), and benzene was removed by evaporation under reduced pressure, thereby obtaining 97.8 g of a polyfunctional cyanoacrylate in a colorless and viscous oil state.

The used benzene was dry benzene, and the glassware had been sufficient dried by heating. The same shall apply in the following Synthesis Examples.

Synthesis Examples 2 To 11

Polyfunctional cyanoacrylates were synthesized in the same manner as those in Synthesis Example 1, except that the listed polyols in Table 1 were used instead of the polypropylene glycol used in Synthesis Example 1 as the compound forming a backbone skeleton, and that the charging amounts were based on the number average molecular weight and the number of functional groups of the compound.

The number average molecular weights of the polyfunctional cyanoacrylates of Synthesis Examples 1 to 11 were measured by GPC (type name "ALLIANCE 2695", manufactured by Waters Corp.) [column: two pieces of "TSKgel SuperMultipore HZ-H" manufactured by Tosoh Corporation and two pieces of "TSKgel Super HZ-2500" manufactured by Tosoh Corporation were linked; mobile phase: tetrahydrofuran, measurement temperature: 40° C., molecular weight: relative to a polystyrene standard].

TABLE 1

| Synthesis Example | Polyfunctional cyanoacrylate | | Compound for synthesis of polyfunctional cyanoacrylate | | | | |
|---|---|---|---|---|---|---|---|
| | Type | Number average molecular weight | Compound | Number average molecular weight | Number of functional group | Charged amount (g) | Product name |
| 1 | A | 19700 | Polypropylene glycol | 10000 | 2 | 94.5 | "Preminol S-4011" by ASAHI GLASS CO., LTD. |
| 2 | B | 2690 | Polycarbonate glycol | 2000 | 2 | 18.9 | "Duranol 5652" by Asahi Kasei Chemicals Corp. |

TABLE 1-continued

| Synthesis Example | Polyfunctional cyanoacrylate | | Compound for synthesis of polyfunctional cyanoacrylate | | | | |
|---|---|---|---|---|---|---|---|
| | Type | Number average molecular weight | Compound | Number average molecular weight | Number of functional group | Charged amount (g) | Product name |
| 3 | C | 17400 | Polypropylene glycol | 10000 | 3 | 63.1 | "Preminol S-3011" by ASAHI GLASS CO., LTD. |
| 4 | D | 3780 | Polypropylene glycol | 2000 | 2 | 18.9 | Reagent |
| 5 | E | 2132 | Polyester glycol | 2000 | 2 | 18.9 | "Kyowapol 2000BA" by KYOWA HAKKO CHEMICAL CO., LTD. |
| 6 | F | 5783 | Polyester glycol | 5000 | 2 | 47.3 | "Kyowapol 5011PAI" by KYOWA HAKKO CHEMICAL CO., LTD. |
| 7 | G | 5457 | Polybutadiene glycol | 2800 | 3 | 43.2 | "Poly bd R-45HT" by Idemitsu Kosan Co., Ltd. |
| 8 | H | 4679 | Hydrogenated polyisoprene glycol | 2500 | 3 | 44.4 | "Epol" by Idemitsu Kosan Co., Ltd. |
| 9 | I | 507 | Polypropylene glycol | 256 | 2 | 2.43 | Reagent |
| 10 | J | 207 | Dipropylene glycol | 135 | 2 | 1.28 | Reagent |
| 11 | K | 912 | di(hydroxypropyl) polydimethylsiloxane | 600~850 | 2 | 6.86 | "DMS-C16" by Gelest Inc. |

[2] Production of Adhesive Composition

Example 1

40 ppm of sulfur dioxide, 100 ppm of 18-crown-6, and 1,000 ppm of hydroquinone were charged to 2-ethoxyethyl 2-cyanoacrylate (based on 100 parts by weight of 2-ethoxyethyl 2-cyanoacrylate). Then 20 parts by weight of the polyfunctional cyanoacrylate A obtained in Synthesis Example 1 was charged to the mixture, stirred at room temperature (15° C.-35° C.) for 5 minutes and mixed to prepare an adhesive composition.

Examples 2 To 5 And Comparative Examples 1 To 2

Adhesive compositions were prepared in the same manner as those in Example 1, except that types of the 2-cyanoacrylate and types and contents of the polyfunctional cyanoacrylate were set as listed in Table 2 (Examples 2 to 5). In addition, adhesive compositions for Comparative Examples 1 and 2 were prepared in the same manner as those in Examples 1 and 5, respectively, except that a polyfunctional cyanoacrylate was not used.

[3] Evaluation of Thermal Shock Resistance

An aluminum plate (of a material defined in JIS A 6061P) was bonded to a test piece made of an ABS resin (product name "ABS-N-WN" manufactured by Shin-Kobe Electric Machinery Co., Ltd.) using any of the adhesive compositions of Examples 1 to 5 and Comparative Examples 1 and 2, left to stand at a temperature of 23° C. for 3 days, and measured for tensile shear adhesive strength in accordance with JIS K 6861. The result was recorded as the initial strength. Subsequently, using a thermal shock test equipment, the sample was kept at −40° C. for 1 hour, and then kept at 80° C. for 1 hour. This cold-heat cycle was repeated ten times, and then the tensile shear adhesive strength was measured in the same manner as above, and recorded as the strength after test. The retention rate was calculated as follows. The results are shown in Table 2.

Retention rate (%)=(strength after test/initial strength)×100

TABLE 2

| | 2-Cyanoacrylate | Polyfunctional cyanoacrylate | | Thermal shock resistance | | |
|---|---|---|---|---|---|---|
| | | Type | Content (parts by weight) | Initial strength (N/mm$^2$) | Strength after treating (N/mm$^2$) | Retention rate (%) |
| Example | | | | | | |
| 1 | 2-Ethoxyethyl 2-cyanoacrylate | A | 20 | 2.5 | 1.0 | 40 |
| 2 | 2-Ethoxyethyl 2-cyanoacrylate | A | 50 | 1.7 | 0.7 | 41 |
| 3 | 2-Ethoxyethyl 2-cyanoacrylate | A | 100 | 0.77 | 0.8 | 104 |
| 4 | 2-Ethoxyethyl 2-cyanoacrylate | B | 50 | 2.0 | 2.4 | 120 |
| 5 | 2-Octyl 2-cyanoacrylate | A | 10 | 5.7 | 2.0 | 35 |
| Comparative Example | | | | | | |
| 1 | 2-Ethoxyethyl 2-cyanoacrylate | — | — | 8.7 | 0 | 0 |
| 2 | 2-Octyl 2-cyanoacrylate | — | — | 7.7 | 0 | 0 |

The results in Table 2 indicate that the adhesive compositions of Examples 1, 2 and 5 had sufficient thermal shock resistance. The adhesive compositions of Example 3 showed a low initial strength but the adhesive strength increased during the thermal shock test, so that the retention rate exceeded 100%. Therefore, it achieved good thermal shock resistance. The adhesive composition of Example 4 showed a high initial strength, and achieved good thermal shock resistance. On the other hand, the adhesive compositions of Comparative Examples 1 and 2 containing no polyfunctional cyanoacrylates were inferior, because they showed a high initial strength, but the retention rate was 0.

Example 6 And Comparative Example 3

40 ppm of sulfur dioxide, 100 ppm of 18-crown-6, and 1,000 ppm of hydroquinone were charged to 2-ethoxyethyl 2-cyanoacrylate (based on 100 parts by weight of 2-ethoxyethyl 2-cyanoacrylate), and then 15 parts by weight of ethylene methyl acrylate acrylic acid copolymer (product name "Vamac MR" manufactured by DuPont Performance Elastomers KK) was dissolved therein. To the mixture, 30 parts by weight of the polyfunctional cyanoacrylate A obtained in Synthesis Example 1 (note that an expression "parts by weight" for the copolymer and polyfunctional cyanoacrylate was based on 100 parts by weight of 2-ethoxyethyl 2-cyanoacrylate) was added, stirred at room temperature (15° C.-35° C.) for 5 minutes and mixed to prepare adhesive compositions. The resultant adhesive compositions were evaluated for the thermal shock resistance in the same manner as in Example 1. Additionally, an adhesive composition for Comparative Example 3 was prepared in the same manner as those in Example 6, except that a polyfunctional cyanoacrylate was not used, and was evaluated for the thermal shock resistance. The results are shown in Table 3.

TABLE 3

| | Content of polyfunctional cyanoacrylate A (parts by weight) | Thermal shock resistance | | |
| --- | --- | --- | --- | --- |
| | | Initial strength (N/mm$^2$) | Strength after treating (N/mm$^2$) | Retention rate (%) |
| Example 6 | 30 | 3.8 | 1.8 | 47 |
| Comparative Example 3 | — | 5.1 | 0.3 | 6 |

Example 7, Comparative Examples 4 And 5

40 ppm of sulfur dioxide, 100 ppm of 18-crown-6, and 1,000 ppm of hydroquinone were charged to 2-ethoxyethyl 2-cyanoacrylate (based on 100 parts by weight of 2-ethoxyethyl 2-cyanoacrylate), and then 7 parts by weight of polyfunctional cyanoacrylate A obtained in Synthesis Example 1 was added. To the mixture, 7 parts by weight of fumed silica (product name "Aerosil RY200" manufactured by Nippon Aerosil Co., Ltd.) was added (note that an expression "parts by weight" for the polyfunctional cyanoacrylate and fumed silica was based on 100 parts by weight of 2-ethoxyethyl 2-cyanoacrylate), stirred at a temperature between 20° C. and 40° C. for 15 minutes and mixed to prepare adhesive compositions. The resultant adhesive compositions were evaluated for the thermal shock resistance in the same manner as in Example 1. Additionally, an adhesive composition for Comparative Examples 4 was prepared in the same manner as in Example 7, except that polypropylene glycol having hydroxyl groups at each terminal and having number average molecular weight of 10,000 from catalog data (product name "PREMINOL S-4011" manufactured by ASAHI GLASS CO., LTD.) was used instead of the polyfunctional cyanoacrylate, and an adhesive composition for Comparative Examples 5 was prepared in the same manner as in Example 7, except that polyfunctional cyanoacrylate was not used. The resultant adhesive compositions were evaluated for the thermal shock resistance. The results are shown in Table 4.

TABLE 4

| | Polyfunctional cyanoacrylate and the like | | Thermal shock resistance | | |
| --- | --- | --- | --- | --- | --- |
| | | | Strength | | |
| | Type | Content (parts by weight) | Initial strength (N/mm$^2$) | after treating (N/mm$^2$) | Retention rate (%) |
| Example 7 | A | 7 | 6.7 | 3.5 | 52 |
| Comparative Example 4 | Polypropylene glycol | 7 | 1.1 | 0 | 0 |
| Comparative Example 5 | — | — | 6.0 | 0 | 0 |

The results in Table 3 indicate that the adhesive composition of Example 6 containing a copolymer achieved a sufficient thermal shock resistance. On the other hand, the adhesive composition of Comparative Example 3 containing no polyfunctional cyanoacrylates showed a low retention rate, being inferior. In addition, the results in Table 4 indicate that the adhesive composition of Example 7 containing a fumed silica achieved a high initial strength and excellent thermal shock resistance. On the other hand, both the adhesive composition of Comparative Example 4 containing polypropylene glycol and the adhesive composition of Comparative Example 5 containing no polyfunctional cyanoacrylates had the strength after test of 0 and thus the retention rate of 0, being inferior.

Example 8

40 ppm of sulfur dioxide, 100 ppm of 18-crown-6, and 1,000 ppm of hydroquinone were charged to 2-ethoxyethyl 2-cyanoacrylate (based on 100 parts by weight of 2-ethoxyethyl 2-cyanoacrylate), and then 7 parts by weight of polyfunctional cyanoacrylate A obtained in Synthesis Example 1 was added. And ethylene methyl acrylate acrylic acid copolymer (product name "Vamac MR" manufactured by DuPont Performance Elastomers KK) was dissolved therein in an amount to give the content described in Table 5. Subsequently, fumed silica (product name "Aerosil RY200" manufactured by Nippon Aerosil Co., Ltd.) was added in an amount to give the content described in Table 5 (note that an expression "parts by weight" for the copolymer and fumed silica was based on 100 parts by weight of 2-ethoxyethyl 2-cyanoacrylate). The mixture was stirred at a temperature between 20° C. and 40° C. for 15 minutes and mixed to prepare an adhesive composition. The resultant adhesive composition was evaluated for the thermal shock resistance in the same manner as in Example 1. The results are shown in Table 8.

Examples 9 To 17 And Comparative Examples 6 To 11

Adhesive compositions were prepared in the same manner as those in Example 8, except that the polyfunctional cyanoacrylates, ethylene methyl acrylate acrylic acid copolymer (product name "Vamac MR" or "Vamac GLS" manufactured by DuPont Performance Elastomers KK), or ethylene methyl acrylate copolymer (product name "Vamac DP" manufactured by DuPont Performance Elastomers KK) for Examples 9 to 17 and Comparative Examples 6, 8 to 11, and fumed silica (product name "Aerosil RY200" or "Aerosil 200" manufactured by Nippon Aerosil Co., Ltd.) for Examples 9 to 17 and Comparative Examples 7 to 11 that were listed in Table 5 were used in amounts to give the contents described in Table 5. The resultant adhesive compositions were evaluated for the thermal shock resistance in the same manner. The results are shown in Table 8.

TABLE 5

| | | Polyfunctional cyanoacrylate | | Copolymer | | Fumed silica | |
|---|---|---|---|---|---|---|---|
| | 2-Cyanoacrylate | Type | Content (parts by weight) | Type | Content (parts by weight) | Type | Content (parts by weight) |
| Example | | | | | | | |
| 8 | 2-Ethoxyethyl 2-cyanoacrylate | A | 7 | Vamac MR | 10 | Aerosil RY200 | 8 |
| 9 | 2-Ethoxyethyl 2-cyanoacrylate | A | 5 | Vamac GLS | 25 | Aerosil 200 | 14 |
| 10 | 2-Ethoxyethyl 2-cyanoacrylate | C | 4.6 | Vamac MR | 10 | Aerosil RY200 | 8 |
| 11 | 2-Ethoxyethyl 2-cyanoacrylate | C | 7 | Vamac MR | 10 | Aerosil RY200 | 8 |
| 12 | 2-Ethoxyethyl 2-cyanoacrylate | D | 2 | Vamac MR | 10 | Aerosil RY200 | 8 |
| 13 | 2-Ethoxyethyl 2-cyanoacrylate | E | 7 | Vamac MR | 10 | Aerosil RY200 | 8 |
| 14 | 2-Ethoxyethyl 2-cyanoacrylate | F | 7 | Vamac MR | 10 | Aerosil RY200 | 8 |
| 15 | 2-Octyl 2-cyanoacrylate | A | 20 | Vamac DP | 10 | Aerosil RY200 | 5 |
| 16 | 2-Octyl 2-cyanoacrylate | G | 20 | Vamac DP | 10 | Aerosil RY200 | 5 |
| 17 | 2-Octyl 2-cyanoacrylate | H | 20 | Vamac DP | 10 | Aerosil RY200 | 5 |
| Comparative Example | | | | | | | |
| 6 | 2-Ethoxyethyl 2-cyanoacrylate | — | — | Vamac MR | 10 | — | — |
| 7 | 2-Ethoxyethyl 2-cyanoacrylate | — | — | — | — | Aerosil RY200 | 8 |
| 8 | 2-Ethoxyethyl 2-cyanoacrylate | I | 7 | Vamac MR | 10 | Aerosil RY200 | 8 |
| 9 | 2-Ethoxyethyl 2-cyanoacrylate | J | 7 | Vamac MR | 10 | Aerosil RY200 | 8 |
| 10 | 2-Ethoxyethyl 2-cyanoacrylate | K | 7 | Vamac MR | 10 | Aerosil RY200 | 8 |
| 11 | 2-Octyl 2-cyanoacrylate | — | — | Vamac DP | 10 | Aerosil RY200 | 5 |

The composition, number average molecular weight, and weight average molecular weight of the product name "Vamac series" from DuPont Performance Elastomers KK for Examples 6, 8 to 17 and Examples 18 to 24 described later are listed in Table 6. The presence or absence of the surface treatment onto the fumed silica represented by the product name "Aerosil series" from Nippon Aerosil Co., Ltd., the type of a surface treatment agent, and a residual amount of SiOH which is used as an index of hydrophilicity and hydrophobicity, are listed in Table 7.

In Table 6, "E", "MA", "AA", and "BA" represent ethylene, methyl acrylate, acrylic acid, and butyl acrylate, respectively.

The proportion between ethylene and acrylate, which are components of the copolymer, was measured by the above-described $^1$H-NMR ("ECA-400", manufactured by JEOL Ltd.), using chloroform-d as the solvent at room temperature. The proportion of acrylic acid was determined by acid value measurement in accordance with JIS K 0070. The average molecular weight was measured by GPC (type name "ALLIANCE 2695", manufactured by Waters Corp.) [column: two pieces of "TSKgel SuperMultipore HZ-H" manufactured by Tosoh Corporation and two pieces of "TSKgel Super HZ-2500" manufactured by Tosoh Corporation were linked; mobile phase: tetrahydrofuran, measurement temperature: 40° C., molecular weight: relative to a polystyrene standard].

TABLE 6

| | Composition for copolymerization (% by mol) | | | | Average molecular weight (×10$^4$) | |
|---|---|---|---|---|---|---|
| Vamac series | E | MA | AA | BA | Mn | Mw |
| MR | 69.2 | 30.0 | 0.8 | 0 | 5.2 | 24.0 |
| GLS | 60.7 | 38.4 | 0.9 | 0 | 5.3 | 28.3 |
| DP | 65.3 | 34.7 | 0 | 0 | 5.2 | 31.4 |

TABLE 6-continued

| | Composition for copolymerization (% by mol) | | | | Average molecular weight (×10$^4$) | |
|---|---|---|---|---|---|---|
| Vamac series | E | MA | AA | BA | Mn | Mw |
| G | 70.0 | 29.2 | 0.8 | 0 | 3.3 | 26.2 |
| Ultra LT | 64.6 | 14.5 | 2.0 | 19.0 | 8.1 | 27.5 |

TABLE 7

| Aerosil series | Surface treating | Residual amount of SiOH (/nm$^2$) |
|---|---|---|
| RY200 | Dimethylsilicone oil | 0.29 |
| 200 | — | 1.80 |

TABLE 8

| | | Thermal shock resistance | | |
|---|---|---|---|---|
| | | Initial strength (N/mm$^2$) | Strength after treating (N/mm$^2$) | Retention rate (%) |
| Example | 8 | 6.2 | 5.9 | 95 |
| | 9 | 3.6 | 3.3 | 92 |
| | 10 | 7.3 | 6.4 | 87 |

TABLE 8-continued

| | | Thermal shock resistance | | |
|---|---|---|---|---|
| | | Initial strength (N/mm²) | Strength after treating (N/mm²) | Retention rate (%) |
| | 11 | 5.3 | 8.4 | 160 |
| | 12 | 5.8 | 5.1 | 89 |
| | 13 | 4.9 | 4.6 | 95 |
| | 14 | 5.2 | 5.3 | 102 |
| | 15 | 2.4 | 2.1 | 88 |
| | 16 | 2.6 | 2.3 | 88 |
| | 17 | 2.6 | 2.3 | 89 |
| Comparative Example | 6 | 6.5 | 0.5 | 8 |
| | 7 | 7.2 | 0 | 0 |
| | 8 | 6.4 | 2.1 | 33 |
| | 9 | 6.5 | 1.0 | 15 |
| | 10 | 5.7 | 1.8 | 32 |
| | 11 | 3.5 | 1.1 | 31 |

The results in Table 8 indicate that the adhesive compositions containing 2-octyl 2-cyanoacrylate as the 2-cyanoacrylate showed a lower adhesive strength, but achieved a higher retention rate and sufficient thermal shock resistance, in comparison with those containing 2-ethoxyethyl 2-cyanoacrylate. The retention rates in the adhesive compositions of Examples 8 to 17 had the tensile shear adhesive strength of 87% or higher (from 87% to 160%) after the thermal shock test, while the retention rate slightly varied depending on the type and content of the polyfunctional cyanoacrylate, the type and content of the copolymer, and the type and content of the fumed silica. These results suggest that the adhesive compositions have an excellent good thermal shock resistance. On the other hand, the retention rates in the adhesive compositions of Comparative Examples 6 to 11 had 33% or less. In particular, the adhesive composition of Comparative Example 7 containing no polyfunctional cyanoacrylates and no copolymers had the strength after test of 0 and thus the retention rate of 0, being inferior.

Examples 18 And 19

Adhesive compositions were prepared in the same manner as those in Example 8, except that two kinds of 2-cyanoacrylates listed in Table 9 were used instead of 2-ethoxyethyl 2-cyanoacrylate alone. The resultant adhesive compositions were evaluated for the thermal shock resistance. The results are shown in Table 9.

TABLE 9

| | 2-cyanoacrylate | | Thermal shock resistance | | |
|---|---|---|---|---|---|
| | Type | Content (parts by weight) | Initial strength (N/mm²) | Strength after treating (N/mm²) | Retenion rate (%) |
| Example | | | | | |
| 18 | Ethyl 2-cyanoacrylate 2-Ethoxyethyl 2-cyanoacrylate | 50 50 | 8.3 | 7.2 | 87 |
| 19 | Isobutyl 2-cyanoacrylate 2-Ethoxyethyl 2-cyanoacrylate | 50 50 | 7.9 | 7.2 | 91 |

The results in Table 9 indicate that the retention rates in the case where ethyl 2-cyanoacrylate and isobutyl 2-cyanoacrylate were used in combination and the case where ethyl 2-cyanoacrylate and 2-ethoxyethyl 2-cyanoacrylate were used in combination were extremely high as that in the case where 2-ethoxyethyl 2-cyanoacrylate alone was used, and that the initial strengths were also high.

Example 20

40 ppm of sulfur dioxide, 100 ppm of 18-crown-6, and 1,000 ppm of hydroquinone were charged to isobutyl 2-cyanoacrylate (based on 100 parts by weight of isobutyl 2-cyanoacrylate), and then 50 parts by weight of polyfunctional cyanoacrylate G obtained in Synthesis Example 7 was added. And ethylene methyl acrylate acrylic acid copolymer (product name "Vamac G" manufactured by DuPont Performance Elastomers KK) was dissolved therein in an amount to give the content described in Table 10. Subsequently, fumed silica (product name "Aerosil RY200" manufactured by Nippon Aerosil Co., Ltd.) was added in an amount to give the content described in Table 10 (note that an expression "parts by weight" for the copolymer and fumed silica was based on 100 parts by weight of isobutyl 2-cyanoacrylate). The mixture was stirred at a temperature between 20° C. and 40° C. for 15 minutes and mixed to prepare an adhesive composition. The resultant adhesive composition was evaluated for the thermal shock resistance in the same manner as in Example 1. The hot water resistance described later was also evaluated by the following method. The results are shown in Table 11.

Examples 21 To 24 And Comparative Examples 12 And 13

Adhesive compositions were prepared in the same manner as those in Example 20, except that the polyfunctional cyanoacrylates for Examples 20 to 24, ethylene methyl acrylate acrylic acid copolymer (product name "Vamac G" manufactured by DuPont Performance Elastomers KK), or ethylene methyl acrylate butyl acrylate acrylic acid copolymer (product name "Vamac Ultra LT" manufactured by DuPont Performance Elastomers KK) for Examples 21 to 24 and Comparative Example 13, and fumed silica (product name "Aerosil RY200" manufactured by Nippon Aerosil Co., Ltd.) for Examples 21 to 24 and Comparative Examples 12 and 13 that were listed in Table 10 were used in amounts to give the contents described in Table 10 to formulate to isobutyl 2-cyanoacrylate or isopropyl 2-cyanoacrylate. The resultant adhesive compositions were evaluated for the thermal shock resistance and hot water resistance in the same manner. The results are shown in Table 11.

TABLE 10

| | 2-cyanoacrylate | Polyfunctional cyanoacrylate | | Copolymer | | Fumed silica | |
|---|---|---|---|---|---|---|---|
| | | Type | Content (parts by weight) | Type | Content (parts by weight) | Type | Content (parts by weight) |
| Example | | | | | | | |
| 20 | Isobutyl 2-cyanoacrylate | G | 50 | Vamac G | 10 | Aerosil RY200 | 5 |
| 21 | Isobutyl 2-cyanoacrylate | H | 20 | Vamac G | 10 | Aerosil RY200 | 5 |
| 22 | Isobutyl 2-cyanoacrylate | G | 20 | Vamac Ultra LT | 10 | Aerosil RY200 | 5 |
| 23 | Isopropyl 2-cyanoacrylate | G | 100 | Vamac G | 10 | Aerosil RY200 | 5 |
| 24 | Isopropyl 2-cyanoacrylate | A | 100 | Vamac G | 10 | Aerosil RY200 | 5 |
| Comparative Example | | | | | | | |
| 12 | Isobutyl 2-cyanoacrylate | — | — | — | — | Aerosil RY200 | 5 |
| 13 | Isobutyl 2-cyanoacrylate | — | — | Vamac G | 10 | Aerosil RY200 | 5 |

[4] Evaluation of Hot Water Resistance

A test piece made of ABS resin and an aluminum plate, which were same ones used in the above-described evaluation of thermal shock resistance, were bonded using any of the adhesive compositions of Examples 20 to 22 and Comparative Examples 12 and 13 under the same conditions as above, left to stand at a temperature 23° C. for 3 days, and measured for tensile shear adhesive strength in accordance with JIS K 6861. The result was recorded as the initial strength. Subsequently, the sample was immersed in hot water at 60° C. for 1 week, and then the tensile shear adhesive strength was measured in the same manner as above, and recorded as the strength after test. The retention rate was calculated as follows. The results are shown in Table 11.

Retention rate (%)=(strength after test/initial strength)×100

TABLE 11

| | Thermal shock resistance | | | Hot water resistance | | |
|---|---|---|---|---|---|---|
| | Initial strength (N/mm$^2$) | Strength after treating (N/mm$^2$) | Retention rate (%) | Initial strength (N/mm$^2$) | Strength after treating (N/mm$^2$) | Retention rate (%) |
| Example | | | | | | |
| 20 | 2.6 | 2.4 | 92 | 2.6 | 2.4 | 92 |
| 21 | 2.0 | 1.8 | 90 | 2.0 | 2.6 | 130 |
| 22 | 3.0 | 2.6 | 87 | 3.0 | 2.1 | 70 |
| 23 | 2.6 | 2.1 | 81 | 2.6 | 2.4 | 92 |
| 24 | 4.8 | 3.9 | 81 | 4.8 | 3.9 | 81 |
| Comparative Example | | | | | | |
| 12 | 8.4 | 0 | 0 | 8.4 | 1.4 | 17 |
| 13 | 7.5 | 0.3 | 4 | 7.5 | 1.5 | 20 |

According to the results in Table 11, it is found that sufficient thermal shock resistance and excellent hot water resistance were obtained in the adhesive compositions of Examples 20 to 24. Example 23 containing the polyfunctional cyanoacrylate G, synthesized from polybutadiene glycol was more excellent in hot water resistance than Example 24 containing the polyfunctional cyanoacrylate A, synthesized from polypropylene glycol. The fact proves the effect of the addition of polybutadiene glycol and the like. On the other hand, it was found in the adhesive compositions of Comparative Examples 12 and 13 containing no polyfunctional cyanoacrylates, that the initial strengths were high, but the retention rates after the thermal shock test were low, and that the retention rates after the hot water resistance test were also poor.

INDUSTRIAL APPLICABILITY

The present invention contains a 2-cyanoacrylate, and is useful as a so-called instantaneous adhesive for home, medical and other uses, and in a wide range of products and technical fields in various industries.

What is claimed is:
1. An adhesive composition, comprising:
   (a) a 2-cyanoacrylate; and
   (b) from 1 to 400 parts by weight, based on 100 parts by weight of the 2-cyanoacrylate, of a cyanoacrylate comprising two or more 2-cyanoacryloyl groups,
   wherein the cyanoacrylate (b) is an ester obtained by reacting 2-cyanoacrylic acid with a polyoxyallsylene polyol, a polyester polyol, a polycarbonate polyol, a polybutadiene polyol, a hydrogenated polybutadiene polyol, a polyisoprene polyol, or a hydrogenated polyisoprene polyol, and
   wherein the number average molecular weight of the cyanoacrylate (b) is in the range from 1,000 to 50,000.
2. The adhesive composition of claim 1, further comprising:
   (c) from 2 to 40 parts by weight, based on 100 parts by weight of the 2-cyanoacrylate (a), of a copolymer prepared from (c1) a monomer giving a polymer slightly soluble in the 2-cyanoacrylate (a) and (c2) a monomer giving a polymer soluble in the 2-cyanoacrylate (a).
3. The adhesive composition of claim 2, wherein the monomer (c1) is ethylene, propylene, isoprene, butadiene, or any combination thereof, and
   wherein the monomer (c2) is an acrylic acid ester, a methacrylic acid ester, or a combination thereof.
4. The adhesive composition of claim 2, further comprising:
   (d) from 1 to 30 parts by weight, based on 100 parts by weight of the 2-cyanoacrylate (a), of a fumed silica.
5. The adhesive composition of claim 2, comprising from 3 to 35 parts by weight, based on 100 parts by weight of the 2-cyanoacrylate (a), of the copolymer (c).
6. The adhesive composition of claim 5, comprising from 5 to 30 parts by weight, based on 100 parts by weight of the 2-cyanoacrylate (a), of the copolymer (c).

7. The adhesive composition of claim 1, further comprising:
   (d) from 1 to 30 parts by weight, based on 100 parts by weight of the 2-cyanoacrylate (a), of a fumed silica.

8. The adhesive composition of claim 7, comprising from 1 to 25 parts by weight, based on 100 parts by weight of said 2-cyanoacrylate (a), of the fumed silica (d).

9. The adhesive composition of claim 7, comprising from 2 to 20 parts by weight, based on 100 parts by weight of said 2-cyanoacrylate (a), of the fumed silica (d).

10. The adhesive composition of claim 1, wherein the cyanoacrylate (b) is an ester obtained by reacting 2-cyanoacrylic acid and a polyoxyalkylene polyol.

11. The adhesive composition of claim 1, wherein the cyanoacrylate (b) is an ester obtained by reacting 2-cyanoacrylic acid and a polyester polyol.

12. The adhesive composition of claim 1, wherein the cyanoacrylate (b) is an ester obtained by reacting 2-cyanoacrylic acid and a polycarbonate polyol.

13. The adhesive composition of claim 1, wherein the cyanoacrylate (b) is an ester obtained by reacting 2-cyanoacrylic acid and a polybutadiene polyol.

14. The adhesive composition of claim 1, wherein the cyanoacrylate (b) is an ester obtained by reacting 2-cyanoacrylic acid and a hydrogenated polybutadiene polyol.

15. The adhesive composition of claim 1, wherein the cyanoacrylate (b) is an ester obtained by reacting 2-cyanoacrylic acid and a polyisoprene polyol.

16. The adhesive composition of claim 1, wherein the cyanoacrylate (b) is an ester obtained by reacting 2-cyanoacrylic acid and a hydrogenated polyisoprene polyol.

* * * * *